United States Patent [19]

Norris

[11] Patent Number: 4,705,207

[45] Date of Patent: Nov. 10, 1987

[54] METHOD OF BRAZING COLUMBIUM TO ITSELF USING LOW BONDING PRESSURES AND TEMPERATURES

[75] Inventor: Brian Norris, San Diego, Calif.

[73] Assignee: Rohr Industries, Inc., Chula Vista, Calif.

[21] Appl. No.: 919,760

[22] Filed: Oct. 16, 1986

[51] Int. Cl.⁴ .......................... B23K 1/04; B23K 35/32
[52] U.S. Cl. .............................. 228/194; 228/263.13; 228/263.19; 428/661
[58] Field of Search ...................... 228/263.19, 263.21, 228/263.11, 194, 198; 428/661, 662

[56] References Cited

U.S. PATENT DOCUMENTS

| | | | |
|---|---|---|---|
| 3,046,650 | 7/1962 | Heestand | 228/263.19 |
| 3,170,234 | 2/1965 | Tarr | 228/263.19 |
| 3,214,833 | 11/1965 | Erickson | 428/661 X |
| 3,290,773 | 12/1966 | Wohlberg et al. | 228/263.19 |
| 3,309,767 | 3/1967 | Sama | 228/227 X |
| 3,317,288 | 5/1967 | Marshall | 428/662 |
| 3,594,895 | 7/1971 | Hill | 428/662 X |
| 4,034,454 | 7/1977 | Galasso et al. | 228/194 X |
| 4,448,853 | 5/1984 | Fischer et al. | 228/263.11 |

Primary Examiner—Kenneth J. Ramsey
Attorney, Agent, or Firm—P. J. Schlesinger; J. M. Cantor; F. D. Gilliam

[57] ABSTRACT

The disclosure relates to a method of bonding columbium to columbium wherein a brazing foil of titanium which has been coated with either a layer of copper or a layer of nickel or layers of copper and then nickel, preferably on both sides of the foil, is disposed between the columbium sheets or the like to be joined. The columbium are placed in intimate contact with opposite sides of the foil and heated to a temperature above the eutectic point of the eutectics of the metals of the foil and no higher than about 1750° F. for about 90 minutes and then cooled to provide the desired bond.

16 Claims, 3 Drawing Figures

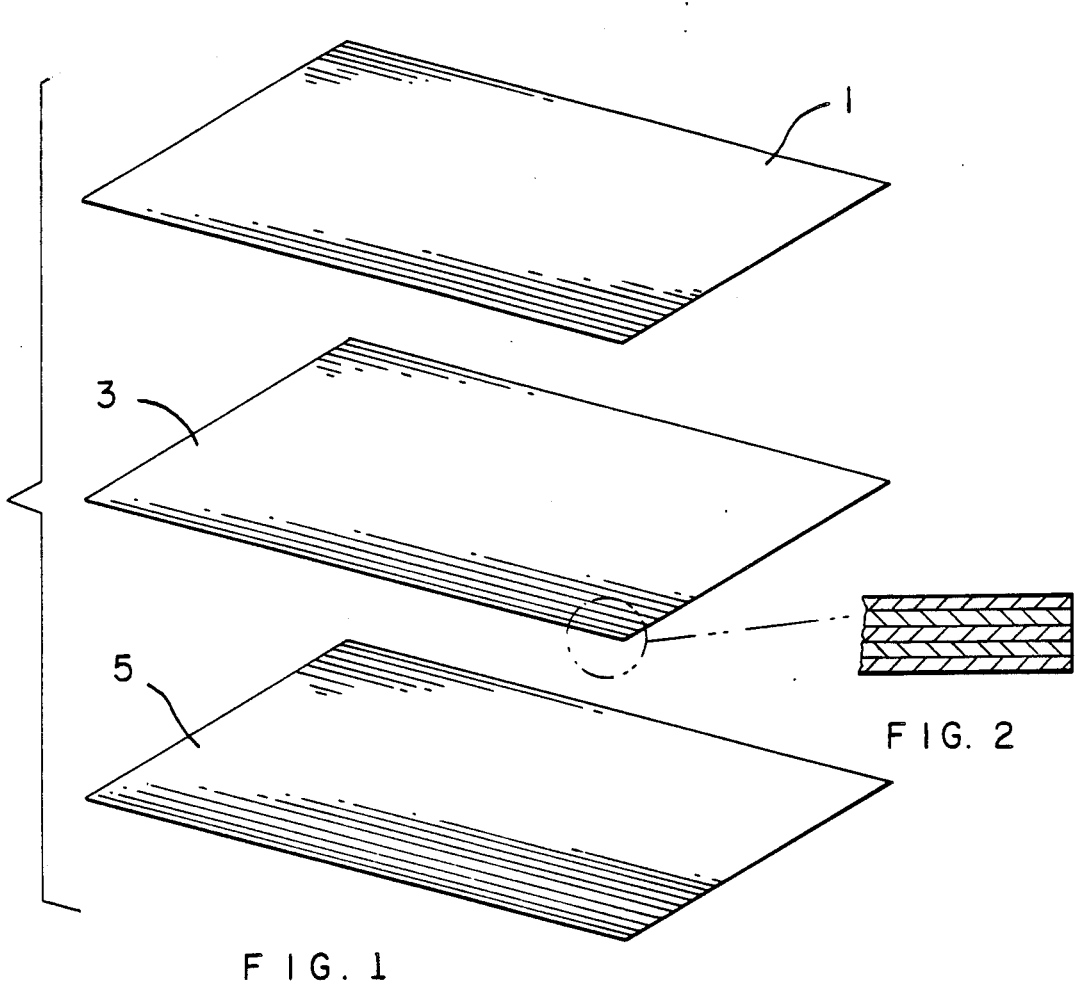
FIG. 2
FIG. 1
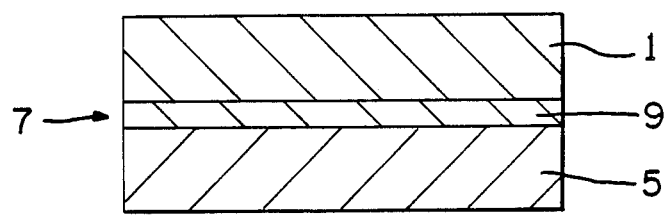
FIG. 3

METHOD OF BRAZING COLUMBIUM TO ITSELF USING LOW BONDING PRESSURES AND TEMPERATURES

BACKGROUND OF THE INVENTION

1. Field of the Invention

This invention relates to a method of brazing columbium to to itself and, more specifically, to a method of performing such brazing under low pressure and low temperature conditions while eventually producing a high remelt temperature.

2. Brief Description of the Prior Art

Columbium (Cb) is a desirable material for use in environments requiring high temperature regimes (i.e., about 2000° to about 2500° F.), such as for use in thermal protection systems. For these purposes, it is necessary that thin gauge columbium be bondable to itself below 2400° F., the usual maximum temperature of vacuum brazing furnaces, and achieve a remelt temperature in excess of 2500° F.

Brazing of columbium usually employs braze alloys which flow between 2600° and 3100° F. These braze alloys or fillers have high melting points to accommodate useful operations to 2500° F. without remelt. If this high remelt temperature is not required, then columbium may be brazed at 1920° F. using 48Ti-48Zr-4Be or 75Zr-19Cb-6Be. Columbium has been bonded at temperatures down to 1450° F. using diffusion bonding techniques (with or without titanium interlayers), however, this technique requires significant bonding pressures (100 psi to 10 ksi) and, as such, does not lend itself to the bonding of intricately stiffened, thin gauge columbium sheets and the like.

In accordance with the prior art, if a high remelt temperature is required, then columbium may be brazed/bonded to itself using either high temperatures, about 2600° F. and higher, with low pressure or alternatively, using low temperatures, about 1500° to 2000° F., with high pressure, in the above noted pressure range. If a low remelt temperature is permissible, then columbium may be brazed at 1920° F.

Other noted prior art of interest is U.S. Pat. No. 3,046,650 which relates to braze bonding of columbium at high brazing temperatures (3138° to 3182° F.) and U.S. Pat. No. 4,331,286 appears to be generally concerned with aluminum and copper and uses an interlayer which will produce a low melting point eutectic with the base metals, the temperature being raised to the eutectic temperature to produce the eutectic liquid. From 2 to 10 ksi bonding pressure is then applied to squeeze out most of the eutectic liquid and cooling then takes place at a fast rate (10° to 500° C./sec) to prevent intermetallic phase formation and/or further liquid production.

SUMMARY OF THE INVENTION

In accordance with the present invention, there is provided a novel method for bonding columbium and preferably columbium foil to itself using low temperature and low pressure as compared with the prior art. This novel method is more versatile than the prior art techniques which require high bonding pressures at low temperatures or high temperatures with low bonding pressures and allows foil gauge columbium to be brazed to produce, for example, columbium thermal protection systems. The invention comprises a unique low temperature-low pressure method of brazing columbium wherein an electroplated titanium brazing foil is used. The electroplated material is either copper alone, nickel alone or a layer of copper under nickel, preferably on both sides of the columbium foil in all of the embodiments. During the bonding cycle, a eutectic is formed which wets and then brazes the columbium foil members to each other. Partial or total dilution of the interlayers into the columbium results in remelt temperatures higher than the original brazing temperature. This is an improvement over prior art techniques.

More specifically, the bond is formed, in accordance with the present invention, by providing a thin sheet of chemically pure titanium foil which has been electroplated with either nickel, copper or alternate layers of nickel and copper on both sides of the foil in the manner as shown in U.S. Pat. No. 3,957,194 of Woodward. The chemically pure titanium foil is about 0.1 to about 5 mils and preferably about 0.2 to 0.5 mils in thickness. The columbium samples used were a pair of two mil thick sheets with plated titanium foil therebetween. Various combinations of electroplated foil and columbium sheets or foils were bonded in a vacuum using 14.7 psi bonding pressure on the foils to maintain contact therebetween, at temperatures of either 1725° F. for 90 minutes or at 2000° F. for 120 minutes, in vacuum. As the temperature of the materials passed through the eutectic temperatures of the materials in contact with each other, a liquid was formed and flowed into all spaces between the sheets to cause joining thereof. The temperature in the furnace was then reduced to a level low enough so that no undesirable chemical reaction would take place, the furnace was opened and the final product removed therefrom when sufficiently cool to handle. As is apparent, the joining temperature utilized was low compared to prior art brazing temperatures required for columbium joining.

BRIEF DESCRIPTION OF THE DRAWINGS

FIG. 1 is an exploded view of an arrangement to be brazed in accordance with the present invention;

FIG. 2 is a cross sectional view of the foil member 3 of FIG. 1; and

FIG. 3 is a cross-sectional view of the brazed product in accordance with the present invention.

DESCRIPTION OF THE PREFERRED EMBODIMENT

Referring now to FIG. 1, there is shown an exploded view of an arrangement for brazing a thin columbium sheet 1 to a sheet 5 formed of columbium. The sheets 1 and 5 are placed in intimate contact with opposite faces of a thin brazing foil 3. The brazing foil 3 is formed of titanium onto which has been electroplated on both sides thereof either layers of copper or layers of nickel or layers of copper and than nickel, the copper and then nickel version being shown in FIG. 2.

The two thin sheets of columbium were bonded together in accordance with the procedures of the present invention as set forth in detail hereinbelow with the foil therebetween under the conditions as set forth hereinbelow.

A list of the samples, showing the plating sequences and the bonding temperature is shown in the table hereinbelow wherein all dimensions are in thousandths of an inch.

| SAMPLE DESIGNATION | ELECTROPLATE THICKNESS | FOIL THICKNESS | ELECTROPLATE THICKNESS | BONDING TEMP. °F. |
|---|---|---|---|---|
| 1-Ni-1725 | 0.1 Ni | 1.0 Ti | 0.1 Ni | 1725 |
| 1-Ni-2000 | 0.1 Ni | 1.0 Ti | 0.1 Ni | 2000 |
| 0.2-Ni-1725 | 0.02 Ni | 0.2 Ti | 0.02 Ni | 1725 |
| 0.2-Ni-2000 | 0.02 Ni | 0.2 Ti | 0.02 Ni | 2000 |
| 1-Cu-1725 | 0.65 Cu | 1.0 Ti | 0.65 Cu | 1725 |
| 1-Cu-2000 | 0.65 Cu | 1.0 Ti | 0.65 Cu | 2000 |
| 0.2-Cu-1725 | 0.13 Cu | 0.2 Ti | 0.13 Cu | 1715 |
| 0.2-Cu-2000 | 0.13 Cu | 0.2 Ti | 0.13 Cu | 2000 |
| 1-LID-1725 | 0.375 LID | 1.0 Ti | 0.375 LID | 1725 |
| 1-LID-2000 | 0.375 LID | 1.0 Ti | 0.375 LID | 2000 |
| 0.2-LID-1725 | 0.075 LID | 0.2 Ti | 0.075 LID | 1725 |
| 0.2-LID-2000 | 9,965 LID | 0.2 Ti | 0.075 LID | 2000 |

In the above table, the term LID is a trademark of ROHR Industries, Inc. and represents the Cu-Ni arrangement on the titanium foil of FIG. 2 as set forth in the above mentioned Woodward patent. The relative proportions of Cu or Ni with the Ti were chosen to reflect their approximate respective eutectic compositions. The columbium was abrasively cleaned prior to bonding. In each of the above examples, two 2 mil columbium sheets were laid up with a 0.125 inch overlap. The various plate Ti foils as set forth in the above chart were placed between the columbium sheets with bonding being carried out in a vacuum using 14.7 psi bonding pressure on the foils for 90 minutes when the temperature was 1725° F. and for 120 minutes when the temperature was 2000° F.

An analysis of the above samples after bonding indicated that all of the samples bonded at 2000° F. suffered from excessive erosion. The excess liquid which was produced caused these samples to bond to the slip sheets in spite of the stop-off. The samples bonded with the 1 mil foil at 1725° F. exhibited wrinkling. Macro and microscopic examination indicated that the comparatively thick titanium foil had not completely reacted with the other elements present. On cooling, the titanium would contract faster than the columbium, causing the observed wrinkling. The 1725° F. samples bonded with the 0.2 mil coated Ti foils had far better appearances than the other samples, although in certain areas, leaked eutectic liquid caused the samples to bond to the slip sheets. Micrographs showed that the Cu coated Ti interlayer (the 0.2 Cu-1725 sample noted hereinabove in the table) produced the best bond followed by the Ni coated Ti interlayer (the 0.2 Ni-1725 sample noted hereinabove in the table).

In order to perform suitable lap shear and remelt studies, the experiment was repeated using a 0.2 Cu-1725 type interlayer and improved stop-off material. Due to the chemical milling difficulties encountered while trying to produce 0.2 mil Ti foil for this sample, a 0.5 mil foil was used instead. The 0.5 mil foil was coated with 0.12 mil of Cu on each side.

The interlayer was placed between the 0.125 inch lap joint and the specimen was adequately coated with nicrobraz green stop-off. The specimen was bonded as described above (14.7 psi bonding pressure, 1725° F. for 90 minutes). A good ductile bonded specimen was produced. The diffusion zone in this sample was slightly larger than in the one described above, reflecting the thicker interlayer used. All the lap shear samples failed outside the bonded area. Remelt studies were carried out in an evacuated bell jar on ¼ inch wide bonded strips. Platinum/platinum-rhodium thermocouples were connected to the bond area. The joint was observed with binoculars to determine the remelt temperature. The temperature was raised up to 2400° F. without producing any melting, thereby providing that the remelt temperature was in excess of 2400° F.

The result is that a diffusion brazing type of bonding mechanism has taken place. The copper and titanium react at 1625° F. to produce a eutectic liquid which wets the columbium. Diffusion of the copper and titanium into the columbium reduces the liquid interface until isothermal solidification occurs. Further dilution at the interface results in the raising of the remelt temperature to more than 2400° F.

It is therefore readily apparent that columbium has been brazed to itself at 1725° F. using a copper coated titanium interlayer. A ductile joint was produced. The remelt temperature of the bond was in excess of 2400° F.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A method of bonding columbium to itself comprising the steps of:
    (a) providing a first thin sheet of columbium,
    (b) providing a second member of columbium,
    (c) providing a brazing foil of titanium having a coating thereon taken from the class consisting essentially of copper alone, nickel alone or layers of copper and nickel,
    (d) placing said first sheet and second member in intimate contact with opposite surfaces of said brazing foil,
    (e) heating the arrangement of (d) to a temperature above the eutectic temperature of the compositions of said foil and/or said coating and no higher than about 1750° F. for about 90 minutes; and
    (f) cooling the arrangement of (e) to ambient temperature.

2. The method of claim 1 wherein the coating on said brazing foil is formed by electroplating.

3. The method of claim 1 wherein said coating is disposed on both sides of said brazing foil.

4. The method of claim 3 wherein step (e) is performed in a vacuum.

5. The method of claim 4 wherein said second member is a sheet.

6. The method of claim 3 wherein said second member is a sheet.

7. The method of claim 2 wherein said coating is disposed on both sides of said brazing foil.

8. The method of claim 7 wherein step (e) is performed in a vacuum.

9. The method of claim 8 wherein said second member is a sheet.

10. The method of claim 7 wherein said second member is a sheet.

11. The method of claim 2 wherein step (e) is performed in a vacuum.

12. The method of claim 11 wherein said second member is a sheet.

13. The method of claim 2 wherein said second member is a sheet.

14. The method of claim 1 wherein step (e) is performed in a vacuum.

15. The method of claim 14 wherein said second member is a sheet.

16. The method of claim 1 wherein said second member is a sheet.

* * * * *